July 4, 1933.  T. MIDGLEY, JR  1,917,048
TELLTALE MEANS
Filed Oct. 30, 1931
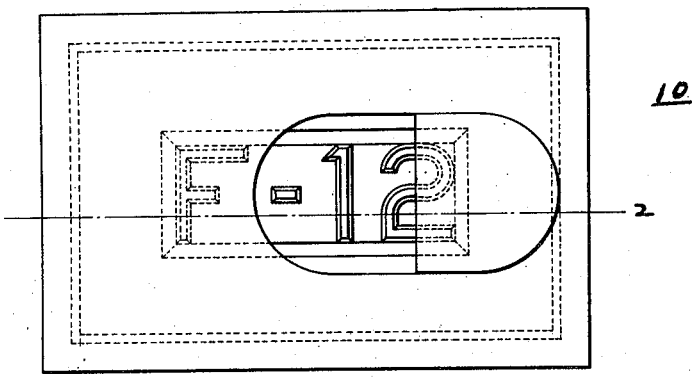
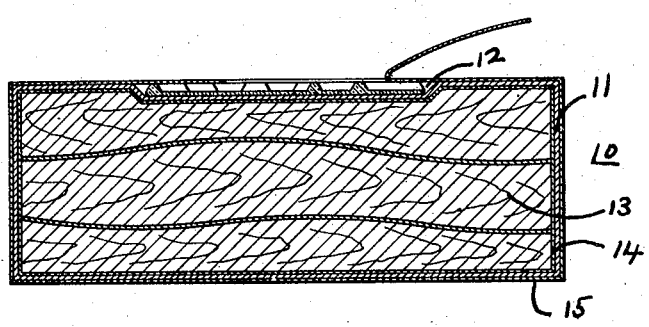

Patented July 4, 1933

1,917,048

UNITED STATES PATENT OFFICE

THOMAS MIDGLEY, JR., OF WORTHINGTON, OHIO, ASSIGNOR TO FRIGIDAIRE CORPORATION, OF DAYTON, OHIO, A CORPORATION OF DELAWARE

TELLTALE MEANS

Application filed October 30, 1931. Serial No. 572,206.

My invention relates to chemistry and more particularly to products and packages containing products, which should be maintained below a predetermined temperature without interruption as will more fully appear from the following specification.

The process of "quick freezing" as an art of preserving food and other products, has become of extreme importance because by such process, it is possible to preserve food in its original fresh condition for an indefinite period of time. For example, meats and fish, quickly frozen, or, in other words, frozen in a very short period of time, retain their pristine qualities and flavors because the cells of the tissues are not broken down by the freezing action. Likewise, fruits, liquids such as milk and fruit juices, and many other food products, will retain their original freshness almost indefinitely if frozen rapidly.

It has become the practice to quick freeze such products and to ship the frozen products to various markets and retail dispensaries where they are stored in a refrigerated place until disposed of. The products must be maintained without interruption in a completely frozen state until dispensed to the consumer if the advantages of the quick freezing process are to be retained.

Also in the case of vaccines and other medicinal and pharmaceutical supplies, it is necessary to maintain the temperature thereof below a certain degree without interruption, if such supplies are to retain their medicinal value.

It frequently happens, however, that due to some cause, accidental or otherwise, the frozen products are permitted to thaw and are subsequently re-frozen slowly before they are dispensed. Such re-frozen products are not the products of quick freezing and should not be dispensed as such.

Also it sometimes happens that the temperature of vaccines etc. rises above the danger point and even though the temperature is subsequently reduced, the medicinal value of the vaccines etc. may have been destroyed.

My invention particularly relates to these latter situations and has for its objects to provide a method of, and means for indicating to the purchaser the exact condition of the frozen products or vaccines; that is, to indicate to him whether the frozen goods have or have not been refrozen, or whether the vaccines have ever reached a temperature above the danger point.

Generically I accomplish these objects by marking the products or the package containing the products in such a way that the original marking is destroyed when the goods have once been thawed or heated above the danger point, and in such a way that the marking cannot be restored even if the goods are re-frozen or cooled.

In the drawing:

Figure 1 is a view in elevation of a frozen food package containing a mark, and

Figure 2 is a sectional view taken on the line 2—2 of Figure 1.

In order to illustrate one mode of carrying out my invention, I have disclosed a frozen food package generally designated by the numeral 10 and comprising a cardboard or paper container 11 provided with a slight depression 12 in its upper surface. The container 11 is shown as containing frozen food products 13 which may be wrapped in paper 14 as shown. Enclosing the container 11 is a wrapping of wax or other transparent paper 15.

Within the depression 12 is located a sheet of ice 16 having a raised marking "F-12" also of ice, which marking is visible through the transparent paper 15.

Assume now that the package 10 contains food products which must be maintained below 32° F. if they are to retain their original freshness. As long as the temperature of the package is maintained below 32° F., the ice marking "F-12" will remain intact. If the temperature of the package rises above 32° F., the marking "F-12" will melt and disappear. Even if the goods are re-frozen, the water contained in the rectangular depression may re-freeze but the marking "F-12" will not reappear thereon. In this manner the absence of the original characteristic marking "F-12" will indicate to the consumer that the goods, even though frozen when purchased, are not the products of quick freezing since they must have been re-frozen at some time after the original quick freezing.

The sheet of ice with the marking "F-12" thereon may be formed in any convenient manner. For instance, it may be formed in a tray having depressions in its lower surface similar to the depressions desired, in this case, "F-12". When the goods are frozen and the package is ready to be wrapped in the paper 15, the sheet of ice may be removed from the tray and placed in the rectangular depression on the upper side of the container.

The foregoing mode of marking is also applicable to frozen products in packages that must be maintained at a temperature lower than 32° F. For example, instead of water ice melting at 32° F., the marking may be made of a frozen brine, so compounded as to melt at the temperature above which it is dangerous to maintain the products.

Other properties than the melting of a compound may be used as an indicator. For example, a compound adapted to change color or to otherwise change its physical or chemical form when its temperature rises above a predetermined degree may be used provided that the original condition or appearance of the marking is not restored on a subsequent lowering of the temperature.

In the case of vaccines, the large container from which the individual phials are dispensed may be marked as indicated above or the individual phials may be marked by a material adapted to permanently change its color or other physical characteristics whenever the temperature rises above a predetermined degree.

The herein described package and marking are for illustrative purposes only and it should be understood that other forms of packages and other marks could be used, or the goods themselves marked directly without departing from the spirit of my invention. Generically, my invention is the broad conception of means and methods for indicating to the purchasing public whether the products they are purchasing have ever reached a temperature above which it is dangerous to maintain the products, if they are to be in their original condition.

I claim:

A frozen food package comprising a container, a wrapper of transparent material enclosing at least a portion of said container, and a visible character formed of frozen material located between said transparent material and said container, said frozen material being adapted to melt and to permanently change in form when the temperature of the package rises to the temperature below which it is desired to maintain the frozen food.

In testimony whereof I hereto affix my signature.

THOMAS MIDGLEY, Jr.